United States Patent
Shinozuka

(10) Patent No.: US 9,189,975 B2
(45) Date of Patent: Nov. 17, 2015

(54) WORLD MAP FOR DEMONSTRATING PROPERTIES OF AZIMUTHAL EQUIDISTANT HEMISPHERIC PROJECTION

(71) Applicant: Yasuo Shinozuka, Foster City, CA (US)

(72) Inventor: Yasuo Shinozuka, Foster City, CA (US)

(*) Notice: Subject to any disclaimer, the term of this patent is extended or adjusted under 35 U.S.C. 154(b) by 266 days.

(21) Appl. No.: 13/987,936

(22) Filed: Sep. 16, 2013

(65) Prior Publication Data

US 2015/0079552 A1    Mar. 19, 2015

(51) Int. Cl.
*G09B 27/08* (2006.01)
*G09B 29/00* (2006.01)

(52) U.S. Cl.
CPC .............. *G09B 29/005* (2013.01); *G09B 27/08* (2013.01)

(58) Field of Classification Search
CPC ............................... G09B 29/005; G09B 27/08
USPC ......... 434/130, 131, 135, 137, 141, 149, 150, 434/153; 33/431, 457
See application file for complete search history.

(56) References Cited

U.S. PATENT DOCUMENTS

| 4,898,137 | A * | 2/1990 | Fujita | F02D 29/02 123/336 |
| 5,902,113 | A * | 5/1999 | Pryor | G09B 29/10 283/34 |
| 7,331,790 | B1 * | 2/2008 | Shinozuka | G09B 27/08 434/135 |
| 8,172,575 | B2 * | 5/2012 | Shinozuka | G09B 29/005 434/135 |

* cited by examiner

*Primary Examiner* — Albert Wong

(57) ABSTRACT

A spherical body map having one hemisphere centered on any given point of the body and another hemisphere centered on its antipodal point is provided in the Azimuthal Equidistant Hemispheric projection. Both hemispheres are placed side by side so to show a great circle line passing through the center and antipodal points straight. This map can show correct directions and distances from the center point to any other points on the body with realistic and recognizable shapes, even for remote continents. It can also demonstrate three important properties of this projection: directions from points along a great circle to a center point do not show the exact opposite of directions from the center point to the points; distances between any two points, not only from the center point, along a great circle line are correct; and the map is convertible from flat to three-dimensional forms.

7 Claims, 2 Drawing Sheets

WORLD MAP FOR DEMONSTRATING PROPERTIES OF AZIMUTHAL EQUIDISTANT HEMISPHERIC PROJECTION

CROSS-REFERENCE TO RELATED APPLICATIONS

The embodiments in this application are related to, supplement, and improve upon those of my previous application Ser. No. 11/033,420, filed Jan. 10, 2005, now U.S. Pat. No. 7,331,790, issued Feb. 19, 2008, and application Ser. No. 12/321,795, filed Jan. 26, 2009, now U.S. Pat. No. 8,172,575, issued May 8, 2012.

BACKGROUND

1. Prior Art

My above two patents disclose a method for transforming a globe represented in a spherical, three-dimensional round format into a flat disc representation using an Azimuthal Equidistant (AE) projection format.

The AE projection is an azimuthal map projection which preserves azimuths (angles or directions) and roundness in general. The projection shows places on the globe in an equidistant (at equal distances) manner, specifically it shows distances from a central point on the map to any other point in an equally spacing. Thus a great circle around Earth can be drawn as a straight line, contrary to wavy lines drawn in the Mercator or other projections. A great circle is a circle with the same diameter as the Earth where any given two points on the circle constitute the shortest distance between these points on the Earth's surface. As great circle lines are always straight on the real Earth when viewed from overhead, the wavy lines on most maps do not reflect reality.

An ordinary world map drawn in the AE projection has serious distortion problem at its periphery. This is because this map requires that all configurations be drawn within one large circle. To overcome this distortion problem, in my previous maps I divided this one large circle into two small circles with half the diameter of the large circle. One of the small circles with any given center point of interest is a main hemisphere, which represents inner half circle of the large AE projection map. Another small circle having the same-size is an opposing hemisphere centered on an antipodal point (a point directly or exactly opposite a given point on Earth), which represents an outer, doughnut-shaped area of the large AE projection map. To distinguish the latter projection with two hemispheres from the ordinary AE projection, I called it an Azimuthal Equidistant Hemispheric projection.

My above '790 patent shows the opposing hemisphere divided in half to provide two resulting semi-hemispheres attached to the right and left sides of the main hemisphere. This procedure enables the continental hemisphere to be featured prominently.

My '575 patent provides a world map projection in which any place in the world can be the center of interest. Also in this projection, the opposing hemisphere is also divided in half, using the same representation as in my '790 patent.

In addition to my own patents, U.S. Pat. No. 5,902,113 to Paul L. Pryor et al., May 11, 1999, entitled, "Map and Calculator Device" shows a map drawn in two hemispheres and in the AE projection. However it differs from the maps of my previous patents in one important aspect: All of my maps show the world in one view. On the other hand, Pryor et al. locate one half of the world on an obverse side of a sheet and the other half on the reverse side. In other words, the two hemispheres are back to back. A user of this map must flip again and again to view any relation of two points separated between obverse and reverse sides.

The Pryor et al. map has elements which can locate antipodal points of any given center point along a great circle line. If the one of elements is moved from the center point, the other of elements is moved from the antipodal point accordingly. Using the same hemispheric map with the same center point, one can still determine the antipodal point of any given point. If one can move the center point and its antipodal point freely, one need not limit the starting point of measurement to the center point. Rather the distance from any point to any other point can be measured correctly if they are located on a line along a great circle.

A poster entitled "Map Projections" by the US Geological Survey, states "Distances and directions to all places [are] true only from center point of projection. Distances [are] correct between points along straight lines through center. All other distances [are] incorrect". This statement is correct but is likely to mislead. The importance of a great circle is that distances between any two points are correct, not just where one point is the center point of projection.

The same thing, however, does not apply to directions. For example, Florida is located due east of San Francisco, but reversely, San Francisco is not located due west of Florida. Directions from all places along a great circle are not true, except from the center point and from its antipode. It is because the Earth is round and north-south lines that determine the bearings are not parallel. I will explain this in more detail under Detailed Description below.

In my '790 patent, FIG. 29 relates to another idea regarding the AE projection, namely the embodiment, "Two Bowl-Shaped Hemispheric Maps". This has merit since it is the only projection which is directly transferable to a globe.

However, its transferability has not been explored fully. Besides, my prior AE Hemispheric projection requires that the opposing hemisphere be divided and it requires means for moving it around the border of other hemisphere in a coordinated way using intermeshed gears.

2. Advantages

The present map integrates further ideas and developments to provide improved embodiments. Accordingly, several advantages of one or more aspects of the present embodiments are:

1. A world map can show how directions of a center point and its antipodal point differ from all other points along a great circle.
2. A world map in the AE projection can be used to measure distances between any two points along a great circle.
3. A world map in the AE Hemispheric projection can show how easily it can be transformed into a spherical form.
4. A hemispheric world map with any center point can be acquired instantly.

Still further advantages of various embodiments will become apparent from consideration of the ensuing description and drawings.

DRAWINGS

SUMMARY

According to one aspect, hemispheric maps are drawn using an Azimuthal Equidistant Hemispheric on stretchable material. This provides three important advantages: 1. Directions from cities along a great circle are not opposite directions from a center point and its antipode. 2. Distances between any two points along a great circle are correct, not only from a center point of projection. 3. While map projections are used for converting from a spherical shape to a flat one, the reverse conversion from a flat shape to a spherical one is possible only with an AE Hemispheric projection.

DETAILED DESCRIPTION

Figure 1:
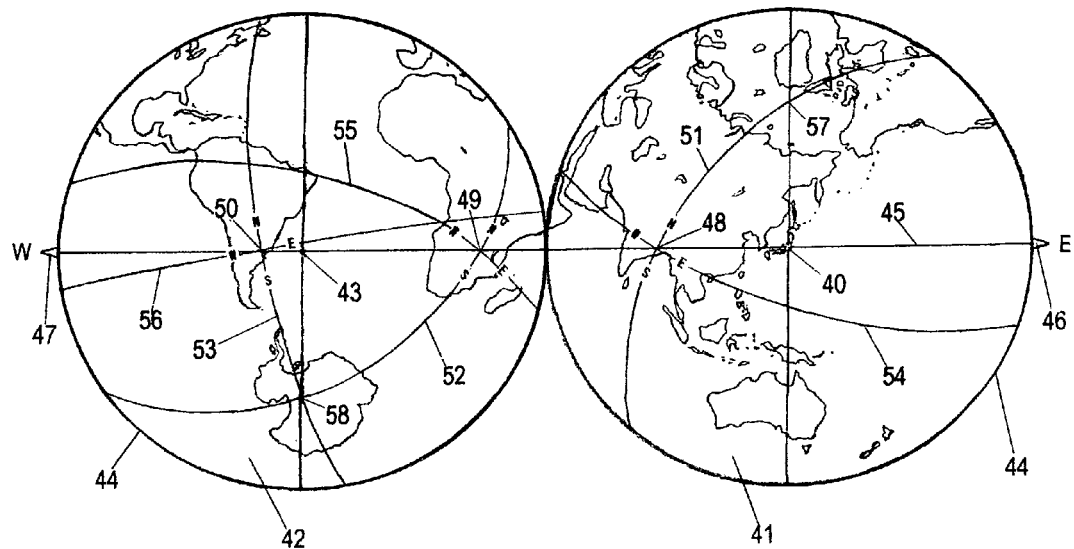
FIG. 1 is first embodiment of my world map centered on Tokyo in an Azimuthal Equidistant Hemispheric projection to demonstrate that Tokyo is not located due east from cities along a great circle due west of Tokyo.

FIG. 1—Pair of Stretchable AE Hemispheric World Maps

In FIG. 1, a pair of AE Hemispheric world maps is made out of stretchable material such as fabric or rubber. The main hemisphere and the opposing hemisphere are printed on the surface of the material. These hemispheres should have rigid rings made of metal or plastic along their borders. The rings are attached to the stretchable material along the borders by sewing or cementing to force the maps to stretch evenly to all directions when used in a case shown in FIG. 3.

The right hemisphere 41 is shown in an AE Hemispheric projection with the center point of interest 40 is Tokyo. The opposing hemisphere 42 is centered on Tokyo's antipode 43, which is a point in the South Atlantic Ocean east of Argentina. The map is printed on stretchable material with rigid rings 44 attached around the borders of respective hemispheres 41 and 42.

The main hemisphere and the opposing hemisphere are placed side by side. As stated in Prior Art section, this map is differed from my former patented maps, in that the opposing hemisphere is undivided.

A great circle line 45 through Tokyo and its antipode aligns in east-west direction. Both ends of the great circle have indicator tabs 46 and 47. Tab 46 indicates due east and tab 47 indicates due west. Three points on or near the great circle—Bodh Gaya, India (point 48), Lusaka, Zambia (point 49), and Buenos Aires, Argentina (point 50)—are indicated by intersections of vertical arcs 51, 52, and 53, and horizontal arcs 54, 55, and 56. These horizontal arc lines show east-west directions of each point. The other important points—the North Pole (point 57) and the South Pole (point 58)—are added.

Incidentally, Bodh Gaya is a holy place because it was where Buddha obtained enlightenment. I selected this place to prove that India is really located in due west of Japan, as Japanese have been saying for more than 1000 years. In the Mercator projection India lies in the south-west direction from Tokyo. The other two cities, Lusaka in Africa and Buenos Aires in South America, are also selected for the same reason. They are all located in due west of Tokyo, despite their tropical image.

Although the directions from Tokyo to those points are all due west, the reverse directions from those points to Tokyo are not due east. This is not well understood by many because most mindsets are bound by conditioning from cylindrical map projections, such as the Mercator. In those map projections, directions of east or west are indicated by latitude lines. For instance, travelling east of Tokyo would take one to a point a few hundred kilometers south from San Francisco. Conversely, west of this point should be Tokyo in such a map. This is true in the practical world but is not true when the direction of a location is considered using the definition of due east and of due west, as discussed below.

If one stands on any given place of a mid- or low-latitude zone on the northern hemisphere and points to the North Pole with a laser beam, it would never hit the North Pole due to curvature of the Earth; rather it would hit the North Star. The direction of the North Star is due north from the given place and the North Pole is underneath it. In the same way, if one directs a laser beam due east (or west) from any given place on Earth, most think it will extend over a place east along latitude lines in the Mercator map, but it does not. If the laser beam could bend along curvature of Earth's surface, it would cross the Equator, pass the antipode, and return to the original place. This supposed circle constitutes a great circle at mean sea level.

As mentioned at the beginning of Prior Art section, a great circle is drawn as a straight line in AE projection maps. And a map drawn in the AE Hemispheric projection can demonstrate that the above-mentioned reversal of the directions in the Mercator is untrue.

Due east of any place on Earth is defined as a cardinal compass point that is at 90° from due north, and due west of it is at 270°. This east-west line crosses a north-south meridian line at right angles. If a center point is located right on the Equator, directions between the center point and any other points on the Equator are exactly opposite to east or west. This is because all points crossing the meridian lines at right angles align with the Equator line. However, this does not apply to other cases with other great circles.

Again, using Bodh Gaya, India as an example, due north from Bodh Gaya is toward the North Pole along a longitudinal line 51. By the above definition, due east of this place is at 90° from due north. It is rightward of arc line 54, not in the direction to Tokyo.

This same rule applies to all other places, including Lusaka, Africa, and Buenos Aires, mentioned above, with the above exception that any points on the Equator are exactly opposite to east or west. While only due west and due east have been mentioned, this applies to any other direction, such as north-west (south-east), north-north-west (south-south-east), etc.

It could be assumed that if an AE Hemispheric map were centered at Mecca, Saudi Arabia, Islamic people all over the world could use it to locate Mecca. But the direction from any place is never the reverse of the direction from Mecca. Thus a map centered on any place on Earth cannot be used to tell the direction to that place from any other place on Earth.

There are other notable properties regarding a great circle. A great circle line showing due east-west has the highest latitude points (the farthest from the equator and the closest to the poles) at a given point and at the given point's antipode. A great circle line also crosses the equator through two points at 90° right and at 90° left away from the longitude of a given point.

Figure 2:
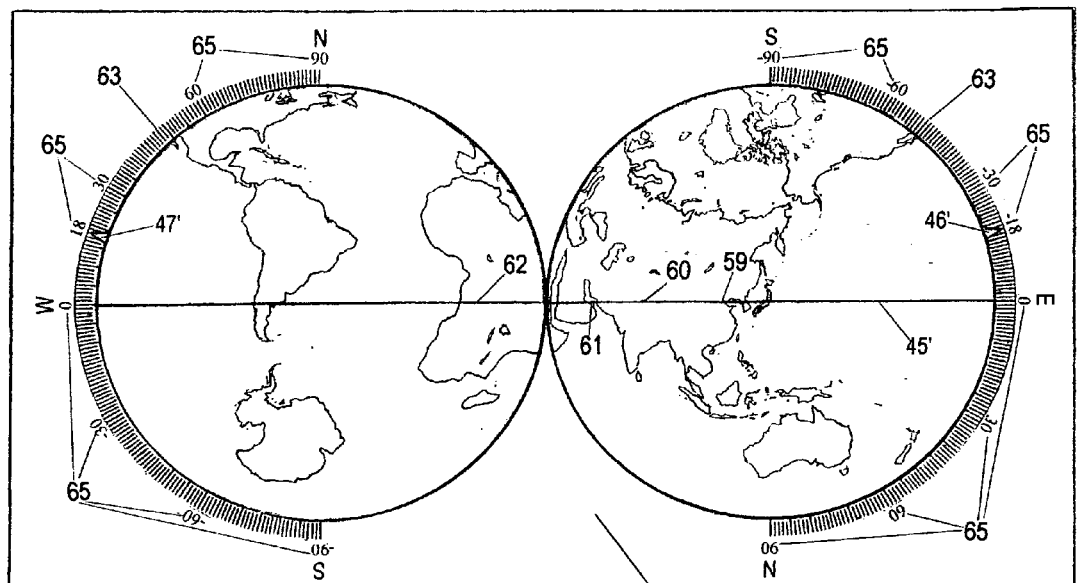
FIG. 2 is the same map as FIG. 1 but is arranged to show that distances between any two points along a great circle are correct, not only from a center point.

FIG. 2—Distances are Measurable Between any Two Points Along a Great Circle

FIG. 2 shows the same map as FIG. 1 but with both hemispheres are moved to a new location. This time, other cities fall on or close to another great circle line 45' through Tokyo. Beijing, China (point 59), Islamabad, Pakistan (point 60), Abu Dhabi, United Arab Emirates (point 61), and Kinshasa, Democratic Republic of the Congo (point 62) are examples of such cities. The distances on the map between any two cities, not only from Tokyo, are shown in the correct proportion to their actual distances. Naturally, the same rule is also applied to the distances between any cities of FIG. 1.

In order to show the direction of this new great circle line, I attach compass bearings 63 around the hemispheres. These bearings can be printed on a background sheet 64 of paper, plastic, wood, metal or any other similar printable material. The term "bearings" is defined a horizontal direction expressed in degrees east (or west) from a true or magnetic north (or south) direction. But here the east-west line replaces the north-south standard line and is designated as 0. Indicator tabs 46' and 47' are located at new bearings, moved away from east-west line toward top of each hemisphere. The distance between tabs 46 and 46' should be the same as the distance between tabs 47 and 47'. Marked degrees (0, 30, −30, 60 . . . between N and S through E or W) 65 of bearings show how far away the indicator tabs are from the east-west standard line. They are marked 0 to 90 degrees toward north and 0 to −90 degrees toward south. Note that the bearings of the right hemisphere are upside-down. In other words the south is at the top of the hemisphere and the north at the bottom.

As shown in FIG. 2, indicator tab 47' indicates 18° from due west toward north. It means that cities, such as Beijing, Kinshasa, and others along great line 45' are all located in a direction 18° west to north (near west-northwest) from Tokyo. We can also find the eastward direction of this great circle by reading another indicator tab 46' as 18° east to south (near east-southeast).

The printability on stretchable material may cause precision of the map to be compromised, as being discussed below in FIG. 4. So, if the map is used only to demonstrate the properties described in connection with FIGS. 1 and 2, rigid material such as paper or plastic may be better for the purpose. Besides it, the map works better when combined with the ruler and the intermeshed gears of my '575 patent. The ruler, the gears and the above-mentioned compass bearings is a good combination that makes the turnings of hemispheres easier and more precise, when distances and directions from a center point are measured.

Figure 3:
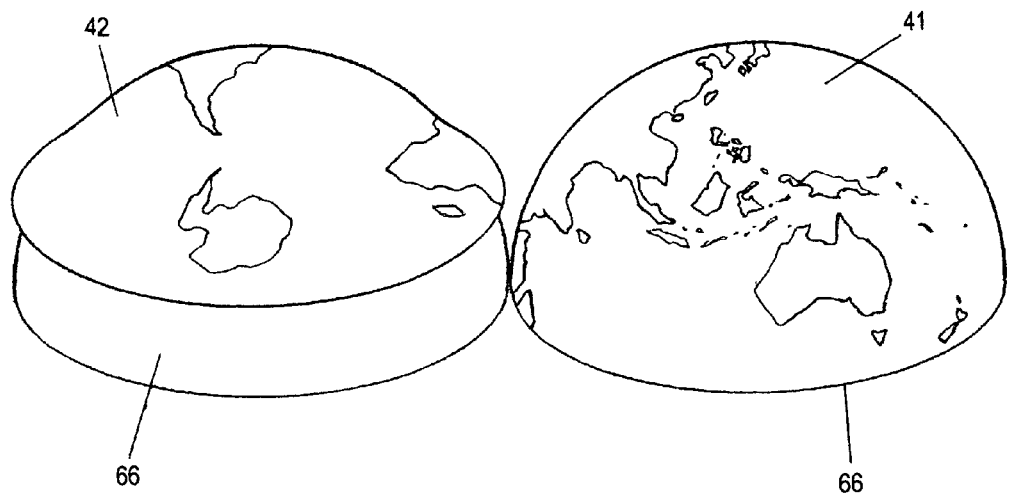
FIG. 3 is the same map as FIG. 1, but showing how the flat form of map is convertible to spherical form.

FIG. 3—Conversion from a Map to the Half-Globe

As known, map projections are used to show a three-dimensional sphere on a two-dimensional flat surface. There are more than hundred different projections for that purpose but no flat maps could heretofore be converted to a three-dimensional sphere. But the AE Hemispheric projection can provide a reverse conversion. As the term equidistant indicates, the distance from a center point to the border of a hemisphere increases at equal rate. This merit of the AE Hemispheric projection allows the conversion from a flat map in this projection to a half-sized globe, if it is stretched evenly—horizontally and vertically.

FIG. 3 shows the hemispheric maps in FIG. 1 converted into spherical form. Two bowl-shaped half-spheres 66 made of transparent plastic or glass are placed side by side. The right half-sphere is already covered by stretchable hemispheric map 41 and the left one is being covered by another map 42. Here the word "half-sphere" designates a hemisphere without a map, distinguished from a "half-globe", which means a hemisphere with a map.

This pair of half-globes is better than the ordinary globe in that the whole earth can be seen at once, even though it is in spherical form. When these hemispheric maps are removed from the half-spheres, this pair of half-globes returns to the original flat maps.

Both half-globes can be joined together to make an ordinary globe. If we cover the half-spheres by the back side of the hemispheric maps and see the maps through transparent plastic or glass, we can enjoy a pair of concave half-globes. Naturally, there are other combinations of half-globes; a pair of convex and concave half-globes as seen in FIG. 29 of my '790 patent or a convexo-concave half-globe when both sheets of hemispheric maps are combined back to back and they cover a single half-sphere.

By covering an ordinary ball, such as a beach ball, a basketball, or any other fair sized balls, with a hemispheric map, we can provide a makeshift half-globe. If we lay two balls side by side and cover one of them with a map of the main hemisphere and another with another map of the opposing hemisphere, this will provide a more instructive and interesting way to study geography.

The principle of the above-mentioned conversion from a flat map to a spherical body is used as one of production methods of a globe. But it is not widely known fact that an AE projection is used for the globe production. Besides, this production method lacks the capability to return to its original shape, differed from my present map.

Figure 4:
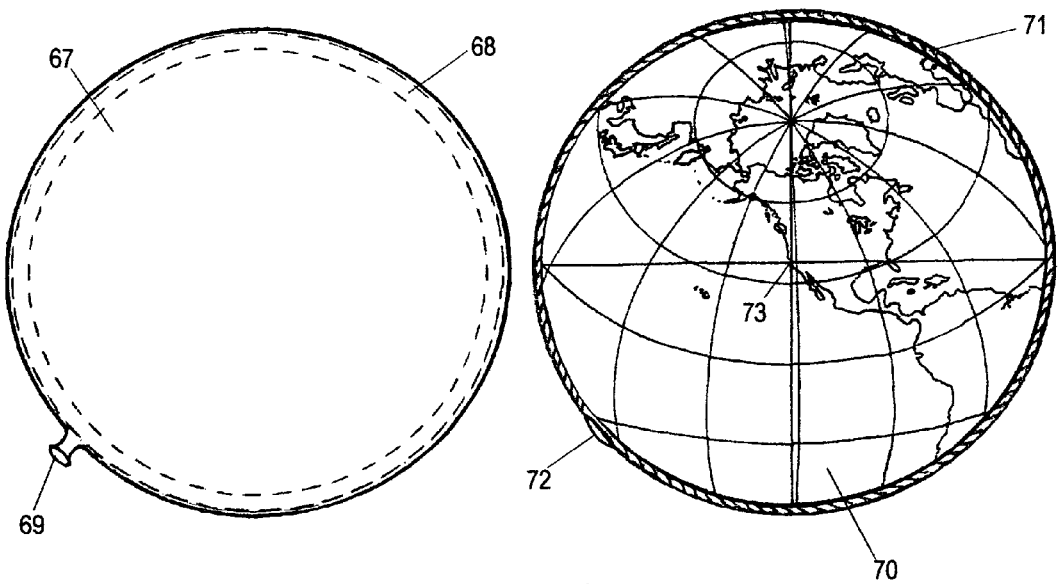
FIG. 4 is a balloon globe which can be transformed into a hemispheric world map of any center point.

FIG. 4—AE Hemispheric Map with any Desired Center Transferred Instantly

An AE Hemispheric map has a fixed center point of interest. I have found a way to make another point of interest the center point instantly. This can be done by computer software after suitable data entry and programming, but I have found a way to do it in an analogous way by utilizing the same property of the projection as in FIG. 3.

The left figure of FIG. 4 shows a surface of a rubber balloon 67 which is easily printable. In this case, assume that a map of the whole world is printed directly on the surface of balloon 67 (the map is omitted here for clarity). This is accomplished using a round ring 68 made of shape memory alloy, such as nitinol, a metal alloy of nickel and titanium that has a transformation temperature. If ring 68 is deformed from an original shape at a low temperature below its transformation temperature, it will restore itself to this original shape when heated to a normal temperature above its transformation temperature. Ring 68 is deformed at the low temperature and inserted inside the balloon through its mouth 69. Nitinol's plastic deformation capability allows the round ring to be deformed flattened enough (not shown) to be inserted through mouth 69 easily. After the flattened ring is inserted, the nitinol is restored to normal temperature and resumes its ring shape. With the balloon containing the ring inside, it becomes a globe when it is inflated and an AE Hemispheric map with the same diameter as the ring when deflated.

In order to make another point of interest the center point, the balloon is inflated slightly larger than the ring to free the ring from the inner wall of the balloon. Now the ring can easily be moved so that the new point of interest is at the center of the ring. Then the balloon is deflated totally so that it again becomes a flat hemispheric map with the new center.

While the above steps enable any point of interest on the earth to be made the center point of the map, printing a world map directly on a surface of a rubber balloon may be somewhat awkward. In order to be used as a real map or globe, more precise printing may be required. At this point, I come to think that printing can be facilitated by providing bag 70 (right side of FIG. 4), made of stretchable and printable fabric, on which the main and opposing hemispheres of an AE Hemispheric projection are printed. In FIG. 1, the rings are attached to the stretchable material along the borders. Instead of using these border rings, the borders of hemispheric maps are sewn to each other back to back along line 71 and become the bag 70. A small aperture 72 remains unsewn for insertion of the balloon 67, which contains the round ring 68 of shape memory alloy. The material of bag should be capable of stretching to a sphere when a balloon inserted inside is inflated.

One may prefer that the sewing line be along the Equator but any border of the set of hemispheres may alternatively be sewn. The hemispheric maps shown in FIG. 1 can be sewn to the bag as described above. But to show that an optional center point is possible, here in FIG. 4, I selected a center point 71 at San Francisco for this hemispheric map. The opposing hemisphere is sewn on the reverse side, but is not shown here.

Conclusion, Ramifications, and Scope

Accordingly the reader will see that, according to one or more aspects, I have provided a world map to demonstrate the properties of an Azimuthal Equidistant Hemispheric projection. The property that reversed directions from points along a great circle do not have direct opposite directions from a center point, as stated in connection with FIG. 1, is a widely known fact in many cartography experts in Japan. Another property that distances between any two points along a great circle are correct, as described in FIG. 2, may also be known to cartography experts as Pryor et al. knew. The third property that the projection can be converted to spherical form and returned to its original shape may be quite unique.

All in all, those properties are not only apparently unknown to the general public, but also they have never been explained visually with illustrations. And those properties can be demonstrated well by a pair of hemispheric maps movable along each periphery. The problems solved by these maps are rarely or never mentioned and can dispel the common misconceptions regarding the Mercator and other projections.

Other properties and advantages of one or more aspects of the AE Hemispheric projection are as follows:

1. The world map in AE Hemispheric projection can show the shortest air routes and correct directions from a center point of interest to any other points on Earth with realistic and recognizable shapes, even for remote continents.
2. Any point of interest on Earth can be used as a center point of projection, unlike other ordinary hemispheric world maps.
3. A flat world map can convey the Earth's roundness.
4. It shows an antipodal point clearly as a point.
5. Any great circle passing through a center point and its antipodal point can be seen as a straight line, unlike the wavy line seen in the Mercator or other projections.
6. Distances between any two points along a great circle can be measured accurately and exact directions from a center point and an antipodal point can be determined.

While the above description contains many specificities, these should not be construed as limitations on the scope, but as exemplifications of some present embodiments. Many other ramifications and variations are possible within the teachings.

For example, if we produce a stretchable ruler made of such material as braided elastic and if the both ends of the ruler have knots of string to limit the maximum stretch to 1.57 ($\pi/2$) times the length of the ruler, we can measure distances between any two points on such globes as well as distances between two points along a great circle of the flat hemispheric maps.

As stated in my '790 patent, the AE Hemispheric projection is also useful for drawing maps of other spherical bodies, such as Mars and the Moon. Now that the properties of this projection are understood, we can draw the maps of such spherical bodies with precise measurements of distances and directions.

By using stretchable material, we can have hemispheric maps of other heavenly bodies. If we have a set of transparent bowl-shaped half-spheres and maps of Mars, the Moon, Venus and others, as well as the Earth's, we can enjoy other world's geography in hand by interchanging such maps of planets and their moons over a pair of half-spheres. Most of us cannot afford to own globes of other planets because of their bulkiness. Now if we have such a set of the half-spheres and a stack of planetary maps, our intimacy toward the planetary geography will be drastically increased.

The bag of hemispheric maps with the balloon, in place of the above-mentioned interchangeable maps, provides almost the same functions as the stack of planetary maps. Since this type of the set does not require the half-spheres, we can save more storage space. Besides, this space saving merit allows us to have a collection of globes of smaller sized terrestrial planets and some of satellites in our living rooms by providing different sized sets of bag, balloon and inner ring in proportion to the size of the real heavenly bodies.

If we have this type of proportionally correct sets of heavenly bodies, we can measure the distances of planets with the same ruler as the one we use for the Earth's map and globe. For example, the moving distance from the landing point of the Mars rover can directly be compared to the distance from our own town.

Thus the scope should be determined by the appended claims and their legal equivalents, and not by the examples given.

I claim:

1. A pair of hemispheric maps for depicting a spherical body, comprising:
    a first sheet of a stretchable material having a map showing a main hemisphere of a spherical body thereon, said map having a predetermined point of the such spherical body centered thereon, said map being arranged in an Azimuthal Equidistant Hemispheric projection,
    a second sheet of said material having a map showing an opposing hemisphere of said spherical body world thereon, centered on an antipodal point of said predetermined point,
    said sheets being positioned adjacent each other at their borders so that adjacent points of each sheet represent contiguous points of actual geographic areas of said spherical body,
    whereby said adjacent points can be moved to a new position by turning said borders, directions and distances from said predetermined point to any other point of said spherical body can be shown with a ruler common to many spherical bodies, and also other properties of an Azimuthal Equidistant Hemispheric projection will be demonstrated visually for educational and other purposes.

2. The pair of hemispheric maps of claim 1, further including an indicator tab attached to said main hemisphere at an edge which is due east from said predetermined point, and another indicator tab attached to said opposing hemisphere at due west edge from said antipodal point.

3. The pair of hemispheric maps of claim 1, further including a background sheet and wherein a plurality of compass bearings are marked on said background sheet, so that degrees of direction from said predetermined point to any other point are measured by reading a value of said indicator tab pointing said compass bearings, when said predetermined point and said any other point align with a straight line representing a great circle.

4. The pair of hemispheric maps of claim 1 wherein said sheets are made of a stretchable material selected from the group consisting of fabric and rubber, said sheets being able to self-restore to their previous shape when a stretching force is removed.

5. The pair of hemispheric maps of claim 4, further including a peripheral border comprising a rigid circular ring attached to said stretchable material.

6. The pair of hemispheric maps of claim 5 wherein said ring is made of a material selected from the class consisting of metal, wood, plastic, and other material strong enough to hold a circular shape when said elastic material is stretched to cover an entire half-sphere.

7. The pair of hemispheric maps of claim 1 wherein said spherical body is a heavenly body selected from the group consisting of Earth, Moon, planets, and their satellites.

* * * * *